(12) United States Patent
Therien et al.

(10) Patent No.: US 10,007,528 B2
(45) Date of Patent: Jun. 26, 2018

(54) COMPUTING PLATFORM INTERFACE WITH MEMORY MANAGEMENT

(71) Applicant: Intel Corporation, Santa Clara, CA (US)

(72) Inventors: Guy M. Therien, Beaverton, OR (US); Paul Diefenbaugh, Portland, OR (US); Anil Aggarwal, Portland, OR (US); Andrew D. Henroid, Portland, OR (US); Jeremy J. Shrall, Portland, OR (US); Efraim Rotem, Haifa (IL); Krishnakanth V. Sistla, Beaverton, OR (US); Eliezer Weissmann, Haifa (IL); Mohan Kumar, Aloha, OR (US); Sarathy Jayakumar, Portland, OR (US); Jose Andy Vargas, Rescue, CA (US); Neelam Chandwani, Portland, OR (US); Michael A. Rothman, Puyallup, WA (US); Robert Gough, Sherwood, OR (US); Mark Doran, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 13/683,748

(22) Filed: Nov. 21, 2012

(65) Prior Publication Data
US 2013/0151569 A1    Jun. 13, 2013

Related U.S. Application Data

(60) Provisional application No. 61/563,030, filed on Nov. 22, 2011.

(51) Int. Cl.
*G06F 17/30* (2006.01)
*G06F 9/4401* (2018.01)
(Continued)

(52) U.S. Cl.
CPC ............. *G06F 9/4403* (2013.01); *G06F 1/26* (2013.01); *G06F 1/28* (2013.01); *G06F 1/3203* (2013.01); *G06F 1/324* (2013.01); *G06F 1/3234* (2013.01); *G06F 1/3275* (2013.01); *G06F 1/3296* (2013.01); *G06F 9/22* (2013.01); *G06F 9/44* (2013.01); *G06F 9/4401* (2013.01); *G06F 9/445* (2013.01); *G06F 11/3024* (2013.01); *G06F 11/3409* (2013.01); *G06F 11/3672* (2013.01); *G06F 17/30339* (2013.01); *G06F 1/206* (2013.01); *G06F 1/32* (2013.01);
(Continued)

(58) Field of Classification Search
CPC ..................................................... G06F 1/3275
USPC ........................................ 707/802, 803, 804
See application file for complete search history.

(56) References Cited

U.S. PATENT DOCUMENTS 4,641,308 A * 2/1987 Sacarisen ............ G06F 11/2236
709/224
4,646,232 A * 2/1987 Chang ................... G06F 13/128
710/113

(Continued)

*Primary Examiner* — Bai D. Vu
(74) *Attorney, Agent, or Firm* — Green, Howard & Mughal LLP

(57) ABSTRACT

In some embodiments, a PPM interface may be provided with functionality to facilitate to an OS memory power state management for one or more memory nodes, regardless of a particular platform hardware configuration, as long as the platform hardware is in conformance with the PPM interface.

19 Claims, 16 Drawing Sheets

(51) Int. Cl.
   *G06F 9/44* (2018.01)
   *G06F 9/445* (2018.01)
   *G06F 1/28* (2006.01)
   *G06F 11/36* (2006.01)
   *G06F 1/26* (2006.01)
   *G06F 9/22* (2006.01)
   *G06F 11/30* (2006.01)
   *G06F 11/34* (2006.01)
   *G06F 9/30* (2018.01)
   *G06F 1/20* (2006.01)
   *G06F 15/78* (2006.01)
   *G06F 1/32* (2006.01)
   *G06F 9/38* (2018.01)

(52) U.S. Cl.
   CPC ........ *G06F 9/3012* (2013.01); *G06F 9/30098* (2013.01); *G06F 9/384* (2013.01); *G06F 11/3447* (2013.01); *G06F 11/3466* (2013.01); *G06F 15/7871* (2013.01); *G06F 2209/501* (2013.01); *G06F 2217/78* (2013.01); *Y02B 60/1217* (2013.01); *Y02B 60/1285* (2013.01)

(56) References Cited

U.S. PATENT DOCUMENTS

| | | | |
|---|---|---|---|
| 7,007,160 B1* | 2/2006 | Makphaibulchoke | G06F 9/4411 713/1 |
| 7,302,698 B1* | 11/2007 | Proudler | G06F 21/57 713/187 |
| 7,594,128 B2* | 9/2009 | Bacchus | G06F 1/3228 713/300 |
| 2003/0188146 A1* | 10/2003 | Hale | G06F 9/30101 713/1 |
| 2006/0174142 A1* | 8/2006 | Lin | G06F 1/3203 713/300 |
| 2007/0005998 A1* | 1/2007 | Jain | G06F 1/3225 713/300 |
| 2007/0043965 A1* | 2/2007 | Mandelblat | G06F 1/3225 713/324 |
| 2007/0073896 A1* | 3/2007 | Rothman | G06F 1/3203 709/232 |
| 2007/0136523 A1* | 6/2007 | Bonella | G06F 9/4401 711/113 |
| 2007/0250219 A1* | 10/2007 | Gaskins | G06F 1/08 700/299 |
| 2007/0260761 A1* | 11/2007 | Lu | G06F 9/4411 710/8 |
| 2007/0288783 A1* | 12/2007 | Ogasawara | G06F 1/3225 713/323 |
| 2008/0059822 A1* | 3/2008 | Choi | G06F 1/3203 713/320 |
| 2008/0148033 A1* | 6/2008 | Sumner | G06F 8/31 713/1 |
| 2008/0189477 A1* | 8/2008 | Asano | G06F 12/0246 711/103 |
| 2009/0327609 A1* | 12/2009 | Fleming | G06F 12/0802 711/118 |
| 2010/0268968 A1* | 10/2010 | Ghiasi | G06F 1/3203 713/300 |
| 2011/0099627 A1* | 4/2011 | Proudler | G06F 21/57 726/21 |
| 2011/0276794 A1* | 11/2011 | Yamaguchi | G06F 9/4413 713/1 |
| 2012/0284475 A1* | 11/2012 | Zaarur | G06F 1/3275 711/165 |

* cited by examiner

| Field | Byte Length | Byte Offset | Description |
|---|---|---|---|
| Header | | | |
| Signature | 4 | 0 | 'MPST'. Signature for Memory Power State Table |
| Length | 4 | 4 | Length in bytes for entire MPST. The length implies the number of Entry fields at the end of the table |
| Revision | 1 | 8 | 1 |
| Checksum | 1 | 9 | Entire table must sum to zero |
| OEMID | 6 | 10 | OEM ID |
| OEM Table ID | 8 | 16 | For the memory power state table, the table ID is the manufacturer model ID |
| OEM Revision | 4 | 24 | OEM revision of memory power state Table for supplied OEM Table ID |
| Creator ID | 4 | 28 | Vendor ID of utility that created the table |
| Creator Revision | 4 | 32 | Revision of utility that created the table |
| Memory PCC | | | |
| MPST Platform Communication Channel Identifier | 1 | 36 | Identifier of the MPST Platform Communication Channel. |
| Reserved | 3 | 37 | Reserved |
| Memory Power Node | | | |
| Memory Power Node Count | 2 | 40 | Number of Memory power Node structure entries |
| Reserved | 2 | 42 | Reserved |
| Memory Power Node Structure[Memory Power Node Count] | — | — | This field provides information on the memory power nodes present in the system. The information includes memory node id, power states supported & associated latencies. Further details of this field are specified in Section 5.2.21.4 |
| Memory Power State Characteristics | | | |
| Memory Power State Characteristics Count | 2 | — | Number of Memory power State Characteristics Structure entries |
| Reserved | 2 | — | Reserved |
| Memory Power State Characteristics Structure [m] | — | — | This field provides information of memory power states supported in the system. The information includes power consumed, transition latencies, relevant flags. |

*FIG. 8*

| Command | Description |
|---|---|
| 0x00-0x02 | All other values are reserved. |
| 0x03 | Execute MPST Command. |
| 0x04-0xFF | All other values are reserved. |

FIG. 9

| Value | State Name | Description |
|---|---|---|
| 0 | MPS0 | This state value maps to active state of memory node (Normal operation). OSPM can access memory during this state. |
| 1 | MPS1 | This state value can be mapped to any memory power state depending on the platform capability. The platform will inform the features of MPS1 state using the Memory Power State Structure. By convention, it is required that low value power state will have lower power savings and lower latencies than the higher valued power states. |
| 2,3...n | MPS2, MPS3, ... MPSn | Same description as MPS1. |

FIG. 11

| Field | Bit Length | Bit Offset | Description |
|---|---|---|---|
| Command Complete | 1 | 0 | If set, the platform has completed processing the last command. |
| SCI Doorbell | 1 | 1 | If set, then this PCC Sub-Channel has signaled the SCI door bell. In Response to this SCI, OSPM should probe the Command Complete and the Platform Notification fields to determine the cause of SCI. |
| Error | 1 | 2 | If set, an error occurred executing the last command. |
| Platform Notification | 1 | 3 | Indicates that the SCI doorbell was invoked by the platform. |
| Reserved | 12 | 4 | Reserved |

FIG. 12

| Field | Byte Length | Byte Offset | Description |
|---|---|---|---|
| Signature | 4 | 0 | The PCC signature. The signature of a subspace is computed by a bitwise-or of the value 0x50434300 with the subspace ID. For example, subspace 3 has signature 0x50434303. |
| Command | 2 | 4 | PCC command field, see Section 14 and Table 5-82. |
| Status | 2 | 6 | PCC status field, see Section 14. |
| Communication Space | | | |
| MEMORY_POWER_COMMAND_REGISTER | 4 | 8 | Memory region for OSPM to write the requested memory power state. Write: 1 to this field to GET the memory power state 2 to this field to set the memory power state 3 – GET AVERAGE POWER CONSUMED 4 – GET MEMORY ENERGY CONSUMED |
| MEMORY_POWER_STATUS_REGISTER | 4 | 12 | Bits 3-0: Status (specific to MEMORY_POWER_COMMAND_REGISTER) • 0000b = Success • 0001b = Not Valid • 0010b = Not Supported • 0011b = Busy • 0100b = Failed • 0101b = Aborted • 0110b = Invalid Data • Other values reserved<br><br>Bit 4: Background Activity specific to the following MEMORY_POWER_COMMAND_REGISTER value: 3 - GET AVERAGE POWER CONSUMED 4 - GET MEMORY ENERGY CONSUMED<br><br>0b = inactive 1b = background memory activity is in progress<br><br>Bits 5-31: Reserved |
| POWER STATE ID | 4 | 16 | On completion of a GET operation, OSPM reads the current platform state ID from this field. Prior to a SET operation, OSPM populates this field with the power state value which needs to be triggered. Power State values will be based on the platform capability |
| MEMORY_POWER_NODE_ID | 4 | 20 | This field identifies Memory power node number for the command. |
| MEMORY_ENERGY_CONSUMED | 8 | 24 | This field returns the energy consumed by the memory that constitutes the MEMORY_POWER_NODE_ID specified in the previous field. A value of all 1s in this field indicates that platform does not implement this field. |
| EXPECTED_AVERAGE_POWER_CONSUMED | 8 | 32 | This field returns the expected average power consumption for the memory constituted by MEMORY_POWER_NODE_ID. A value of all 1s in this field indicates that platform does not implement this field. |

*FIG. 10*

| Field | Byte Length | Byte Offset | Description |
|---|---|---|---|
| Flag | 1 | 0 | The flag describes type of memory node. Refer to Table 5-87 for details. |
| Reserved | 1 | 1 | For future use |
| Memory Power Node Id | 2 | 2 | This field provides memory power node number. This is a unique identification for Memory Power State Command and creation of freelists/cache lists in OSPM memory manager to bias allocation of non power managed nodes vs. power managed nodes. |
| Length | 4 | 4 | Length in bytes for Memory Power Node Structure. The length implies the number of Entry fields at the end of the table |
| Base Address Low | 4 | 8 | Low 32 bits of Base Address of the memory range. |
| Base Address High | 4 | 12 | High 32 bits of Base Address of the memory range. |
| Length Low | 4 | 16 | Low 32 bits of Length of the memory range. This field along with 'Length High' field is used to derive end physical address of this address range. |
| Length High | 4 | 20 | High 32 bits of Length of the memory range. |
| Number of Power States (n) | 4 | 24 | This field indicates number of power states supported for this memory power node and in turn determines the number of entries in memory power state structure. |
| Number of Physical Components | 4 | 28 | This field indicates the number of distinct Physical Components that constitute this memory power node. This field is also used to identify the number of entries of Physical Component Identifier entries present at end of this table. |
| Memory Power State Structure (n) | --- | 32 | This field provides information of various power states supported in the system for a given memory power node |
| Physical Component Identifier 1 | 2 | --- | 2 byte identifier of distinct physical component that makes up this memory power node |
| ... | ... | ... | |
| Physical Component Identifier m | 2 | --- | 2 byte identifier of distinct physical component that makes up this memory power node |

*FIG. 13*

| Bit | Name | Description |
|---|---|---|
| 0 | Enabled | If clear, the OSPM ignores this Memory Power Node Structure. This allows system firmware to populate the MPST with a static number of structures but enable them as necessary. |
| 1 | Power Managed Flag | 1 – Memory node is power managed<br>0 – Memory node is not power managed. For non power managed node, OSPM shall not attempt to transition node into low power state. System behavior is undefined if OSPM attempts this.<br>NOTE: If the memory range corresponding to the memory node include BIOS reserved memory that cannot be power managed, platform should indicate such memory as 'not power managed' to OSPM. This allows OSPM to ignore such ranges from its power optimization. |
| 2 | Hot Pluggable | This flag indicates memory node supports hot plug feature. Refer to section 5 for interaction with memory hot plug. |
| 3-7 | Reserved | Reserved for future use |

*FIG. 14*

| Field | Byte Length | Byte Offset | Description |
|---|---|---|---|
| Power State Value | 1 | 0 | This field provides value of power state. The specific value to be used is system dependent. However convention needs to be maintained where higher numbers indicates deeper power states with higher power savings and higher latencies. For example, a power state value of 2 will have higher power savings and higher latencies than a power state value of 1. |
| Power State Information Index | 1 | 1 | This field provides unique index into the memory power state characteristics entries which will provide details about the power consumed, power state characteristics and transition latencies. The indexing mechanism is to avoid duplication (and hence reduce potential for mismatch errors) of memory power state characteristics entries across multiple memory nodes. |

*FIG. 15*

| Field | Byte Length | Byte Offset | |
|---|---|---|---|
| Power State Structure ID | 1 | 0 | Bit 0:5 = This field describes the format of table Structure.<br><br>Power State Structure ID Value = 1<br><br>Bit 6:7 = Structure Revision<br>Current revision is 1 |
| Flag | 1 | 1 | The flag describes the caveats associated with entering the specified power state. Refer to Table 5-90 for details. |
| Reserved | 2 | 2 | Reserved |
| Average Power Consumed in MPS0 state (in milli watts) | 4 | 4 | This field provides average power consumed for this memory power node in MPS0 state. This power is measured in milliWatts and signifies the total power consumed by this memory the given power state as measured in DC watts. Note that this value should be used as guideline only for estimating power savings and not as actual power consumed. Also memory power node can map to single or collection of RANKs/DIMMs. The actual power consumed is dependent on DIMM type, configuration and memory load. |
| Relative Power Saving to MPS0 state | 4 | 8 | This is a percentage of power saved in MPSx state relative to MPS0 state and should be calculated as ((MPS0 power − MPSx power)/MPS0 Power)*100. When this entry is describing MPS0 state itself, OSPM should ignore this field. |
| Exit Latency (in ns) (MPSx→MPS0) | 8 | 12 | This field provides latency of exiting out of a power state (MPSx) to active state (MPS0). The unit of this field is nanoseconds.<br>When this entry is describing MPS0 state itself, OSPM should ignore this field. |
| Reserved | 8 | 20 | Reserved for future use. |

*FIG. 16*

| Bit | Name | Description |
|---|---|---|
| 0 | Memory Content Preserved | If Bit 0 is set, it indicates memory contents will be preserved in the specified power state.<br>If Bit 0 is clear, it indicates memory contents will be lost in the specified power state (e.g. for states like offline) |
| 1 | Autonomous Memory Power State Entry | If Bit 1 is set, this field indicates that given memory power state entry transition needs to be triggered explicitly by OSPM by calling the Set Power State command.<br>If Bit 1 is clear, this field indicates that given memory power state entry transition is automatically implemented in hardware and does not require a OSPM trigger. The role of OSPM in this case is to ensure that the corresponding memory region is idled from a software standpoint to facilitate entry to the state.<br>Not meaningful for MPS0 – write it for this table |
| 2 | Autonomous Memory Power State Exit | If Bit 1 is set, this field indicates that given memory power state exit needs to be explicitly triggered by the OSPM before the memory can be accessed. System behavior is undefined if OSPM or other software agents attempt to access memory that is currently in a low power state.<br>If Bit 1 is clear, this field indicates that given memory power state is exited automatically on access to the memory address range corresponding to the memory power node. |
| 3-7 | Reserved | Reserved for future use |

*FIG. 17*

| Field | Byte Length | Byte Offset | Description |
|---|---|---|---|
| Header | | | |
| Signature | 4 | 0 | 'PMTT'. Signature for Platform Memory Topology Table. |
| Length | 4 | 4 | Length in bytes of the entire PMTT. The length implies the number of Memory Aggregator structures at the end of the table. |
| Revision | 1 | 8 | 1 |
| Checksum | 1 | 9 | Entire table must sum to zero. |
| OEMID | 6 | 10 | OEM ID |
| OEM Table ID | 8 | 16 | For the PMTT, the table ID is the manufacturer model ID |
| OEM Revision | 4 | 24 | OEM revision of the PMTT for supplied OEM Table ID. |
| Creator ID | 4 | 28 | Vendor ID of utility that created the table. |
| Creator Revision | 4 | 32 | Revision of utility that created the table. |
| Reserved | 4 | 36 | Reserved, must be zero. |
| Memory Aggregator Device Structure [n] | --- | 40 | A list of memory aggregator device structures for the platform. See Table 5-82. |

*FIG. 18*

| Field | Byte Length | Byte Offset | Description |
|---|---|---|---|
| Type | 1 | 0 | The field describes type of the Memory Aggregator Device.<br>0 – Socket<br>1 – Memory Controller<br>2 – DIMM<br>3 – 0xFF - Reserved |
| Reserved | 1 | 1 | Reserved, must be zero. |
| Length | 2 | 2 | Length in bytes for this Structure. This length implies the length of the Type Specific Data at the end of the structure. |
| Flags | 2 | 4 | Bit 0 – set to 1 to indicate that this is a top level aggregator device. This device must be counted in the number of top level aggregator devices in PMTT table and must be surfaces via PMTT.<br>Bit 0 – Set to 0 to indicate that this is not a top level aggregator device.<br>Bit 1 – set to 1 to indicate physical element of the topology. Set to 0 to indicate logical element of topology<br>Bit 2 and 3 –<br>• If 00, indicates that all components aggregated by this device implements volatile memory<br>• If 01, indicates that components aggregated by this device implements both volatile and non-volatile memory<br>• If 10, indicates that all components aggregated by this device implements non-volatile memory<br>• 11 - Reserved<br>Bit 4 – Bit 15 Reserved, must be zero |
| Reserved | 2 | 6 | Reserved, must be zero. |
| Type Specific Data | — | 8 | Type specific data. Interpretation of this data is specific to the type of the memory aggregator device. See Table 5-93, Table 5-94, and Table 5-95. |

*FIG. 19*

| Field | Byte Length | Byte Offset | Description |
|---|---|---|---|
| Type | 1 | 0 | 0 – Socket |
| Reserved | 1 | 1 | Reserved, must be zero. |
| Length | 2 | 2 | Length in bytes for this Structure. The length implies the number of memory controller structures at the end of this structure. |
| Flags | 2 | 4 | Bit 0 – set to 1 to indicate that this is a top level aggregator device.<br>Bit 1 – set to 1 since socket is a physical element of the topology<br>Bit 2 and 3 –<br>• If 00, indicates that all components aggregated by this device implements volatile memory<br>• If 01, indicates that components aggregated by this device implements both volatile and non-volatile memory<br>• If 10, indicates that all components aggregated by this device implements non-volatile memory<br>• 11 – Reserved<br>Bit 4 – Bit 15 Reserved, must be zero |
| Reserved | 2 | 6 | Reserved, must be zero. |
| Socket Identifier | 2 | 8 | Uniquely identifies the socket in the system. |
| Reserved | 2 | 10 | Reserved, must be zero. |
| Memory Controller Structure [n] | --- | 12 | A list of Memory Controller Structures. This list provides information on the memory controllers present in the socket. See Table 5-84. |

*FIG. 20*

COMPUTING PLATFORM INTERFACE WITH MEMORY MANAGEMENT

This application claims the benefit and incorporates by reference herein U.S. Provisional Patent App. No. 61/563,030, filed on Nov. 22, 2011.

BACKGROUND

The present invention relates generally to a platform performance management interface. In particular, it pertains to providing memory power and/or performance management services through a performance management interface in a computing platform.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 8 is an overview table for an MPST table structure in accordance with some embodiments.

FIG. 9 is a table indicating PCC Command Codes used by an MPST platform communication channel in accordance with some embodiments.

FIG. 10 is a table showing an MPST platform communication channel shared memory region in accordance with some embodiments.

FIG. 11 is a table with power state values for a PPM MPST in accordance with some embodiments.

FIG. 12 is a command status table for a PPM MPST in accordance with some embodiments.

FIG. 13 is a table with memory power node structure definitions for a PPM MPST in accordance with some embodiments.

FIG. 14 is a table showing flag formats for a PPM MPST in accordance with some embodiments.

FIG. 15 is a table of memory power state structure definitions for a PPM MPST in accordance with some embodiments.

FIG. 16 is a table showing memory power state characteristics structure for a PPM MPST in accordance with some embodiments.

FIG. 17 is a table showing a flag format for the memory power state characteristics structures of FIG. 16 in accordance with some embodiments.

FIG. 18 is a diagram showing a platform memory topology Table (PMTT) in accordance with some embodiments.

FIG. 19 is a table showing a common memory aggregator device structure in accordance with some embodiments.

FIG. 20 is a table showing a socket structure in accordance with some embodiments.

DETAILED DESCRIPTION

Figure 1:
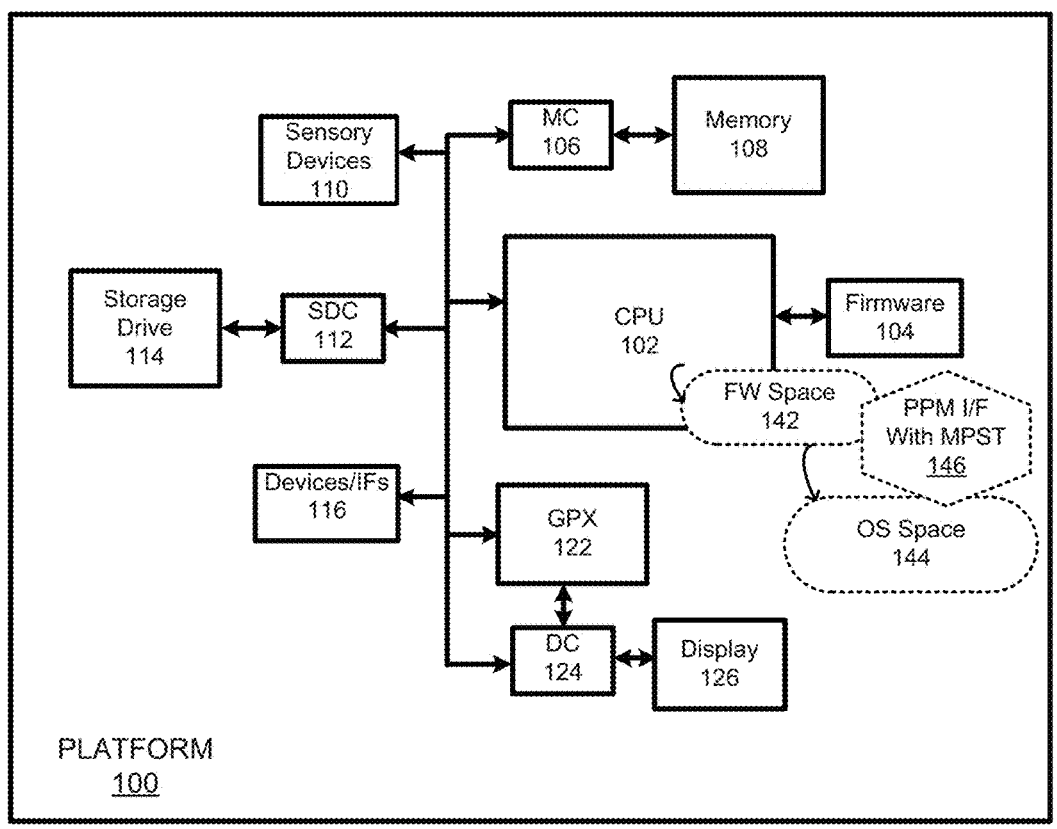
FIG. 1 is a block diagram of a computing platform with MPST support provided through a PPM interface in accordance with some embodiments.

FIG. 1 is a diagram of a portion of a computing platform 100 with a performance and power management (PPM) interface facilitating memory power state (MPS) services in accordance with some embodiments. The computing platform, as generally illustrated in the figure, is intended to represent a variety of different computing platform types including but not limited to servers, desktop PCs, netbooks, ultra-books, tablets, smart-phones, and the like. For simplicity and ease of understanding, details and/or components, not pertinent to this disclosure, for some platform embodiments will have been omitted.

As used herein, the term "PPM" stands for performance and power management and refers to any suitable interface for enabling operating systems, as well as applications through their operating systems, to control, monitor, maintain, etc., hardware components within a platform, as long as the platform and OS at least with regard to a relevant feature, comply with the PPM interface. An example of a PPM is the Advanced Configuration and Power Interface (ACPI).

Memory power state management services, in some implementations, refers to entering and exiting portions of memory (e.g., nodes) into one of several memory power states in order to save power for un-used or under-used memory. Memory typically corresponds to system memory (e.g., DRAM), but it could also encompass cache memory and/or non-volatile memory that is part of a system's memory map). The MPS management is facilitated through a PPM interface, thereby enabling a platform's operating system to manage memory on different platforms, as long as the platform and OS comply, at least in pertinent part, with the PPM interface.

The depicted platform comprises a CPU 102, sensory devices 110 (e.g., gyros, speakers, cameras, etc.), other devices/interfaces (e.g., keypad, pointer device, USB ports, PCI ports, wireless lfs, etc.) 116, and a graphics processor (GPX) 122, coupled together through one or more busses and/or point-to-point interconnects. The platform also includes memory 108 (e.g., DRAM) coupled through a memory controller 106 to at least the CPU 102, and it also includes firmware 104 (e.g., implemented with non-volatile memory such as flash memory) coupled to the CPU 102. The platform additionally includes a display 126 coupled through a display controller 124 to the GPX 122 and/or to the CPU 102. (it should be appreciated that while a single CPU block is shown, the platform may include multiple CPUs and/or processing cores for executing one or more OS threads and for performing various different tasks. However, for simplicity, a single CPU executing an operating system is shown herein.)

The platform further includes a storage drive 114 (e.g., a solid state drive) coupled through a storage drive controller 112 to at least the CPU 102. The storage drive may store data, applications, and one or more operating systems (OS) such as Linux, Windows™, Mac OS™, Android, etc., systems. The firmware 104 includes a BIOS, EFI or other boot/initialization software. (Note that the role of the BIOS has changed over time. For example, in some platforms, the BIOS is being replaced by the more complex EFI (Extensible Firmware Interface), but a BIOS for firmware remains in widespread use. To date, EFI has been supported in Microsoft Windows™ versions supporting GPT, in the Linux kernel 2.6.1 and later, and in Mac OS. However, the distinction between BIOS and EFI is rarely made in terminology by the average computer user, making BIOS a catch-all term for both systems. For simplicity, however, the term "firmware" will be used generally to refer to the BIOS, EFI or alternative boot/initialization code.)

Together, the operating system and firmware include software components to implement a PPM interface 146 for the platform. As abstractly represented in the figure, when the platform starts up, after executing primitive start code, the CPU retrieves and runs the boot software (firmware space 142) and among other things, at that time may establish data structures for the PPM interface 146. Once the firmware space (e.g., BIOS, EFI) has initialized, the OS space 144 is then established as the OS boots within the CPU. At this time, PPM modules within the OS may identify various characteristics of the platform through the PPM interface 146 that is being established.

Figure 2:
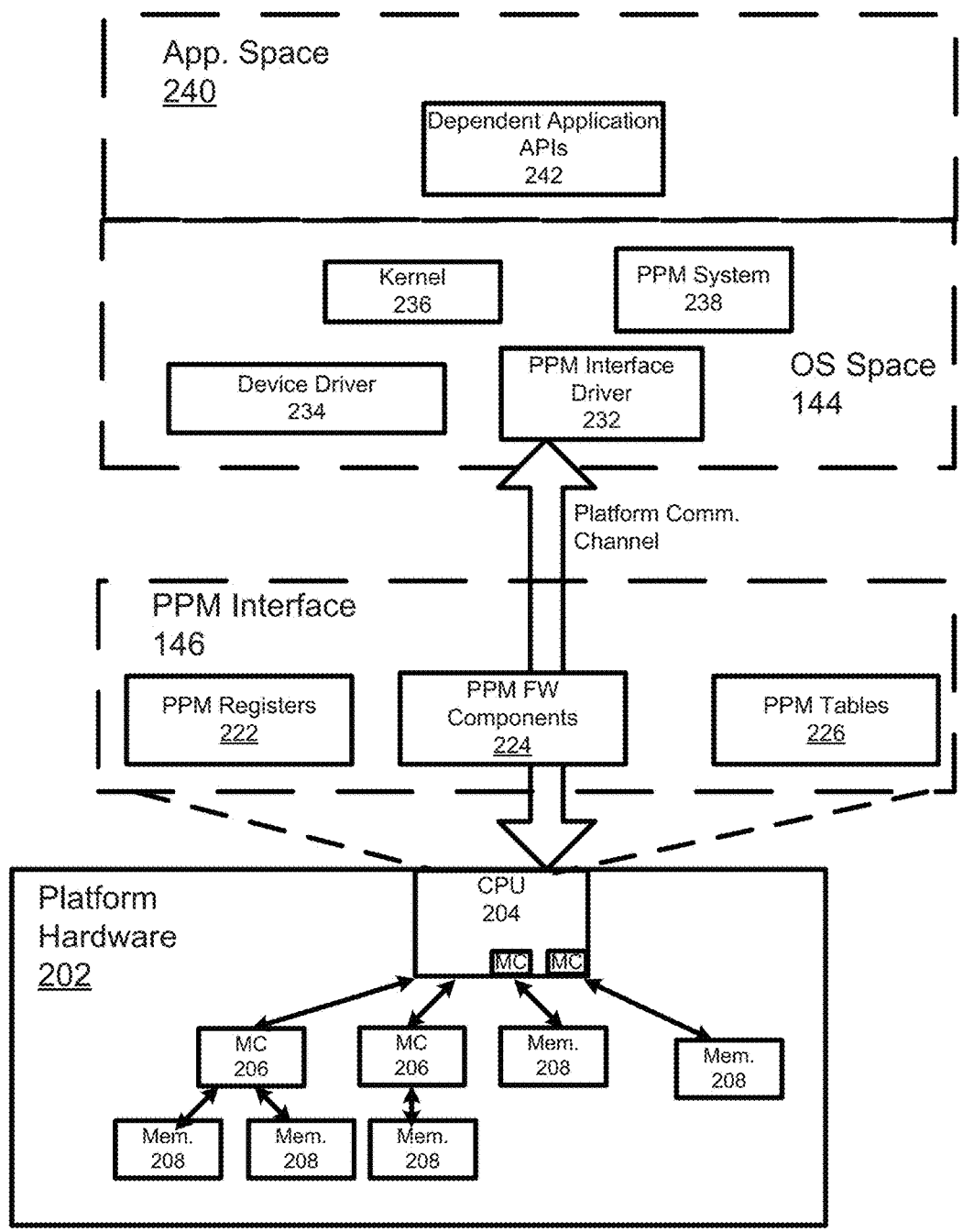
FIG. 2 is a diagram showing an abstracted representation of a PPM interface having an MPST implemented on a platform in accordance with some embodiments.

FIG. 2 is a block diagram abstractly showing a PPM interface for interfacing between OS power and performance functionality, on the one hand, and platform hardware, on the other hand. (It should be noted that this diagram is drawn from an ACPI specification, which henceforth, is used primarily as an example for conveniently presenting some of the principles taught herein. However, the figure has been abstracted and modified to conform with concepts particular to this disclosure. For example, the more general term: "PPM" is used rather than "ACPI" in some places and instead of "OSPM" within the OS space. It should be appreciated that ACPI is a specific implementation of a PPM interface.)

With pertinence to the present disclosure, platform hardware 202 is shown with CPU 102, memory controllers 26 and memory modules 208. The memory controllers may correspond to specific circuits, logic units, controllers, executing software, etc. As indicated, a memory controller may be part of a CPU, or SOC, and/or it could be part of a separate peripheral module such as a control hub chip. The memory modules 208 correspond to physical and/or logical memory modules. They may further be divided, e.g., by their associated memory controller, into memory power nodes for application of memory power states, as discussed below. In some embodiments, when the PPM interface is created, e.g., during platform boot, PPM data structures (e.g., tables 226) are populated with pertinent data (as discussed below with regard to the MPST structure) for implementing memory power state management for the memory modules 208.

The CPU 102, as discussed above, executes firmware and the OS, thereby establishing the PPM interface 146, OS Space 144, and application space 240. The application space includes APIs 242 for applications to run on the platform. The OS space 144 includes PPM interface driver 232, device drivers 234, an OS kernel 236, and a PPM system 238, which facilitates performance and power management from the OS. In the depicted embodiment, a platform control channel (PCC) is implemented by the PPM interface to communicate between the OS PPM functionality and the PPM hardware features.

The PPM interface 146 comprises PPM registers 222, PPM firmware components 224 and PPM tables 226. The registers 222 may correspond to specific registers, e.g., dedicated PPM registers in the hardware, e.g., within the CPU or as part of a controller such as a baseboard controller, or to virtual registers created in software. They also may be a constrained part of the hardware interface, described (at least in location) by the PPM Tables. ACPI, for example, defines a hardware register interface that an ACPI-compatible OS may use to control core power management and performance features of platform hardware, as described in Section 4 of the ACPI 5.0 Specification (the ACPI Hardware Specification).

The PPM firmware components 224 include portions of the firmware corresponding to PPM implementations. Typically, they are used to implement interfaces for sleep, wake, and some restart operations. Pertinent to this disclosure, among other things, they may also include components for defining PPM data structures and tables, including those used for memory power state (MP state) services, and they may also include one or more routines for maintaining and/or updating data and/or addresses in the tables. (Note that some of the ACPI features corresponding to firmware components 224 are described in Section 5.3, "Namespace", of the ACPI 5.0 Specification.

The PPM tables 226, in general, describe the interfaces to the hardware. Some descriptions limit what can be built. For example, some controls may be embedded in fixed blocks of registers, and the table specifies the address of the register block. Most descriptions allow the hardware to be built in arbitrary ways and can describe arbitrary operation sequences needed to make the hardware function. (For the rest of the disclosure, ACPI tables will be described and/or used, implicitly or expressly, as examples of suitable PPM table structures. ACPI tables are generally described in Section 5.2 of the ACPI 5.0 Specification.)

ACPI tables having "Definition Blocks" can make use of a pseudo-code type of language, the interpretation of which can be performed by the OS. That is, OSPM (corresponds to PPM system 238) includes and uses an interpreter that executes procedures encoded in the pseudo-code language and stored in the ACPI tables containing "Definition Blocks." The pseudo-code language, known as ACPI Machine Language (AML), is a compact, tokenized, abstract type of machine language.

Figure 3:
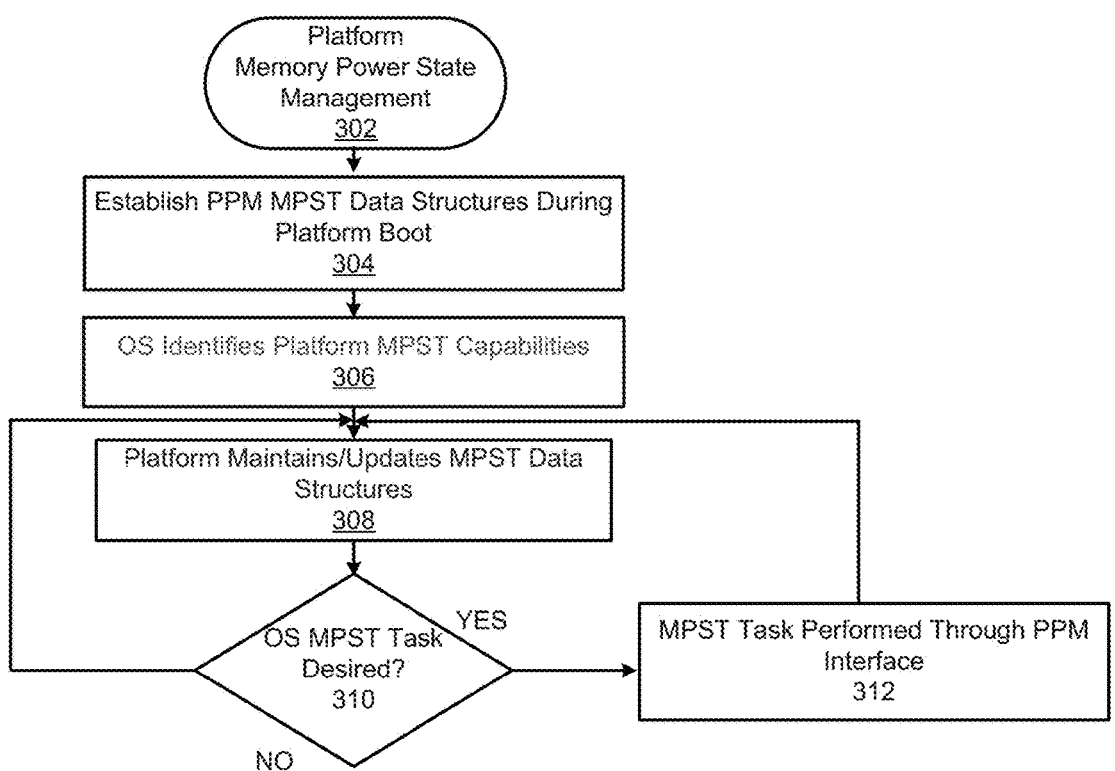
FIG. 3 is a general routine for providing MPST services through a PPM interface to a platform OS in accordance with some embodiments.

FIG. 3 shows a routine 302 for an OS to facilitate memory power state management, in accordance with some embodiments. At 304, during the platform boot, MPST data structures are created in association with the particular platform, e.g., particular hardware, memory and memory configurations, and operating system. That is, a benefit of using a PPM interface is that services may be made available to an OS without the need for a uniform or known platform configuration, as long as the platform and operating system comply with the PPM interface.) Definition tables identifying available MPST information (memory power nodes, particular PCC information, and memory power state characteristic information) provided by various platform hardware components may be generated. This may be done, for example, by PPM components during a firmware boot process. In some ACPI implementations, the booting firmware may create the MPST table structure in dedicated firmware memory space, e.g., space claimed by the firmware and not available for modification to the OS, e.g., made available, if at all, to the OS on a read-only basis.

At 306, the OS identifies platform MPST PPM capabilities. In some embodiments, this occurs when the OS is booted and initializes. PPM components (e.g., OS PPM system 238, from FIG. 2, referred to as OSPM in ACPI) identify the MPST data structures that were created and defined by the firmware PPM components.

At 308, the platform maintains/updates the MPST data structures. This will typically primarily be done at boot but in some cases, some parts may be ongoing while the platform is operating. Some MPST functionality may be provided from hardware, as previously discussed, with memory controllers providing pertinent memory power information for their client memory to the ACPI MPST structures. For example, a memory controller might monitor memory blocks or ranges to assess which are used, busy, etc., e.g., for coalescing or autonomous MP state transitioning. They may then update an appropriate MPST data structure, e.g., PPM table associated with the MPST structure.

Any suitable approach may be used to enable a controller to update a MPST table. For example, it may use the PCC channel in an ACPI implementation. In some embodiments, a memory controller may access the PPM interface by issuing a system interrupt to access a PPM component from the firmware. For example, in most x86 platforms, an SMI (system management interrupt) could be issued to place the system in system management mode (SMM), which results in an SMI handler routine in the platform firmware to be called. The SMI handler could process one or more OS MPST commands (e.g., as defined in the PPM components including data structures such as tables), update MPST structures (e.g., tables) with data from controllers, and/or invoke one or more PPM components, e.g., in firmware, for execution. (Note that as used herein, "system interrupt" refers to any interrupt in any type of platform architecture to cause a CPU to process a desired interrupt handler, a routine usually running outside of the operating system. So, with the present disclosure, it could be any interrupt used to invoke an interrupt handler to directly or indirectly invoke PPM components outside of OS space to service an Oss" MPST task. Typically, but not always, the CPU will suspend running the OS and switch to run the interrupt handler. When finished, the interrupt handler may issue its own interrupt, e.g., ASI or SCI in x86 platforms, to return operation back to the OS. Interrupt handlers, such as an SMI handler in x86 platforms, may conveniently be part of platform firmware.)

At 310, if the OS has an MPST task to be performed, e.g., an OS power management module desires to place one or more memory power nodes into a reduced power state, then at 312, the OS PPM component performs the MPST service request through the PPM interface. In some embodiments, it issues one or more suitable commands and/or address pointers, as defined in the appropriate MPST data structure and invokes the commands via the PPM interface. For example, it could issue a system interrupt (e.g., SMI) after writing command/address information to an appropriate location(s) defined in the table(s) and to ultimately be serviced by PPM components via the interrupt handler (e.g., SMI handler). On the other hand, at 310, if the OS did not need an MPST service, then the routine loops back to 308 as shown.

To give hardware vendors flexibility in choosing their implementation, ACPI uses tables to describe system information, features, and methods for controlling those features. These tables list devices, e.g., devices on the system board or devices that cannot be detected or power managed using some other hardware standard. They also may list system capabilities such as the sleeping power states supported, a description of the power planes and clock sources available in the system, batteries, system indicator lights, and so on. This enables OSPM (PPM system 238 in OS space for ACPI) to control system devices without needing to know how the system controls are implemented.

Figure 4:
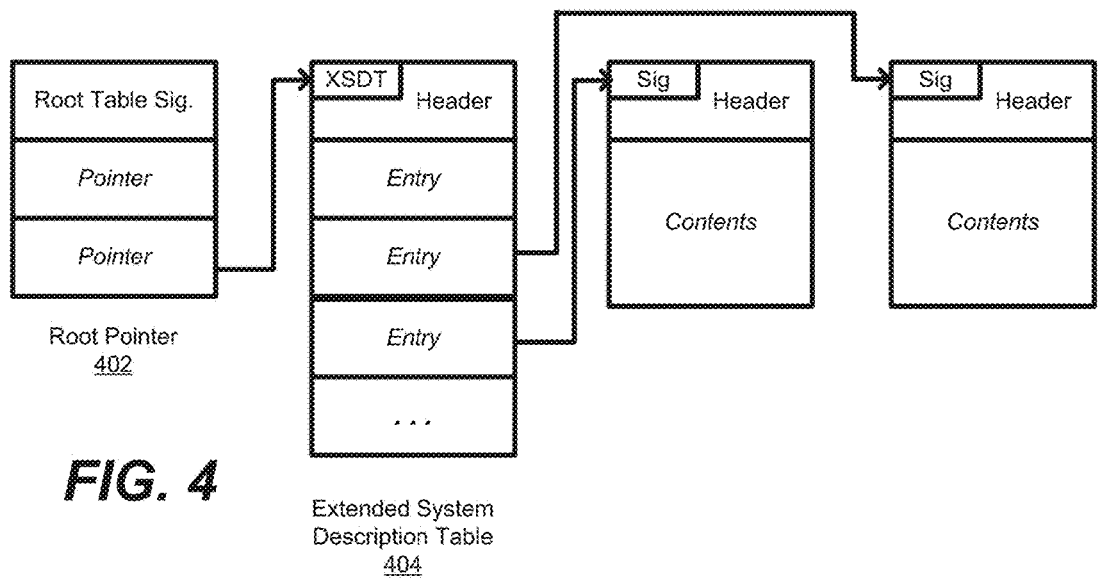
FIG. 4 is a diagram showing a root pointer to a table structure in an ACPI interface in accordance with some embodiments.

FIG. 4 shows a general structure for implementing such tables in accordance with some embodiments. A Root System Description Pointer (RSDP) structure 402 is located in the system's memory address space and may be setup by the platform firmware. This structure contains the address of the Extended System Description Table (XSDT) 404, which references other description tables that provide data to OSPM, supplying it with knowledge of the base system's implementation and configuration.

System description tables should start with identical headers. The primary purpose of the system description tables is to define for OSPM various industry-standard implementation details. Such definitions enable various portions of these implementations to be flexible in hardware requirements and design, yet still provide OSPM with the knowledge it needs to control hardware directly.

OSPM locates that Root System Description Table by following the pointer in the RSDP structure. The RSDT starts with the signature 'RSDT' followed by an array of physical pointers to other system description tables that provide various information on other standards defined on the current system. The OSPM examines each table for a known signature. Based on the signature, OSPM can then interpret the implementation-specific data within the table.

Figure 5:
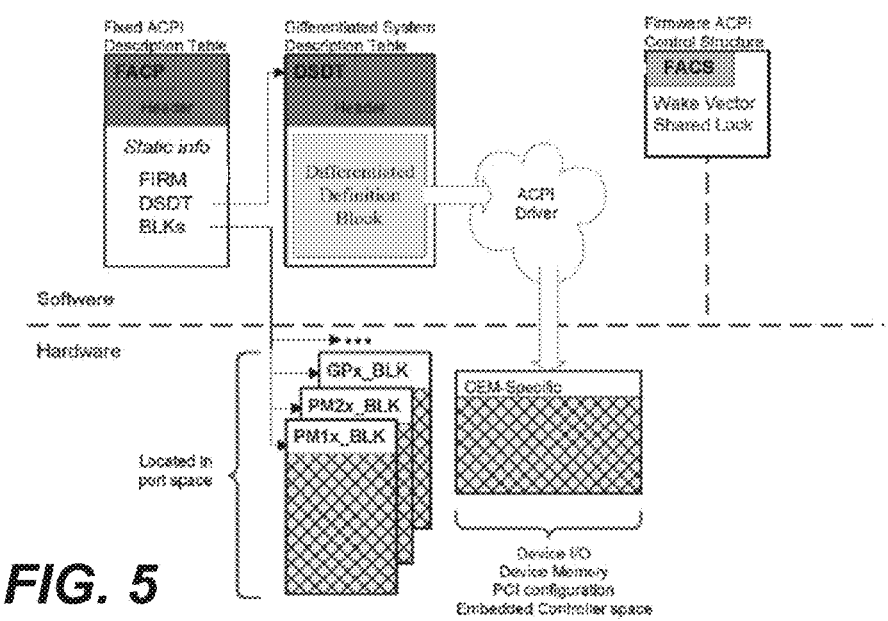
FIG. 5 is a diagram showing a description table structure for an ACPI interface in accordance with some embodiments.

With reference to FIG. 5, the Extended System Description Table (XSDT) is further described. It points to other tables in memory. The first table pointed to by pointer 402, the XSDT points to the Fixed ACPI Description table (FADT). The data within this table includes various fixed-length entries that describe the fixed ACPI features of the hardware. The FADT table refers to the Differentiated System Description Table (DSDT), which contains information and descriptions for various system features. The relationship between these tables is shown in FIG. 5.

When the OS initializes during boot, the OSPM finds the RSDP structure. When the OSPM locates the structure, it looks at the physical address for the Root System Description Table or the Extended System Description Table. The Root System Description Table starts with the signature "RSDT", while the Extended System Description Table starts with the signature "XSDT". These tables contain one or more physical pointers to other system description tables that provide various information about the system. As shown in FIG. 5, there should always be a physical address in the Root System Description Table for the Fixed ACPI Description table (FADT).

When OSPM follows a physical pointer to another table, it examines each table for a known signature. Based on the signature, OSPM can then interpret the implementation-specific data within the description table.

The purpose of the FADT is to define various static system information related to configuration and power management. The Fixed ACPI Description Table starts with the "FACP" signature. The FADT describes the implementation and configuration details of the ACPI hardware registers on the platform.

The GPE0_BLK and GPE1_BLK blocks provide the foundation for an interrupt-processing model for Control Methods. The P_BLK blocks are for controlling processor features. Besides ACPI Hardware Register implementation information, the FADT also contains a physical pointer to a data structure known as the Differentiated System Description Table (DSDT), which is encoded in Definition Block format.

A Definition Block contains information about the platform's hardware implementation details in the form of data objects arranged in a hierarchical (tree-structured) entity known as the "ACPI namespace", which represents the platform's hardware configuration. Definition blocks loaded by OSPM combine to form one namespace that represents the platform. Data objects are encoded in a format known as ACPI Machine Language or AML for short. Data objects encoded in AML are "evaluated" by an OSPM entity known as the AML interpreter. Their values may be static or dynamic. The AML interpreter's dynamic data object evaluation capability includes support for programmatic evaluation, including accessing address spaces (for example, I/O or memory accesses), calculation, and logical evaluation, to determine the result. Dynamic namespace objects are known as "control methods". OSPM "loads" or "unloads" an entire definition block as a logical unit—adding to or removing the associated objects from the namespace. The DSDT should be loaded by OSPM at boot time and should not be unloaded. It contains a Definition Block named the Differentiated Definition Block that contains implementation and configuration information OSPM can use to perform power management, thermal management, or Plug and Play functionality that goes beyond the information described by the ACPI hardware registers.

Definition Blocks can either define new system attributes or, in some cases, build on prior definitions. A Definition Block can be loaded from system memory address space. One use of a Definition Block is to describe and distribute platform version changes.

Definition blocks enable wide variations of hardware platform implementations to be described to the ACPI-compatible OS while confining the variations to reasonable boundaries. Definition blocks enable simple platform implementations to be expressed by using a few well-defined object names.

Some operators perform simple functions and others encompass complex functions. The power of the Definition Block comes from its ability to allow these operations to be glued together in numerous ways, to provide functionality to OSPM. The operators present are intended to allow many useful hardware designs to be ACPI-expressed, not to allow all hardware designs to be expressed.

Figure 6:
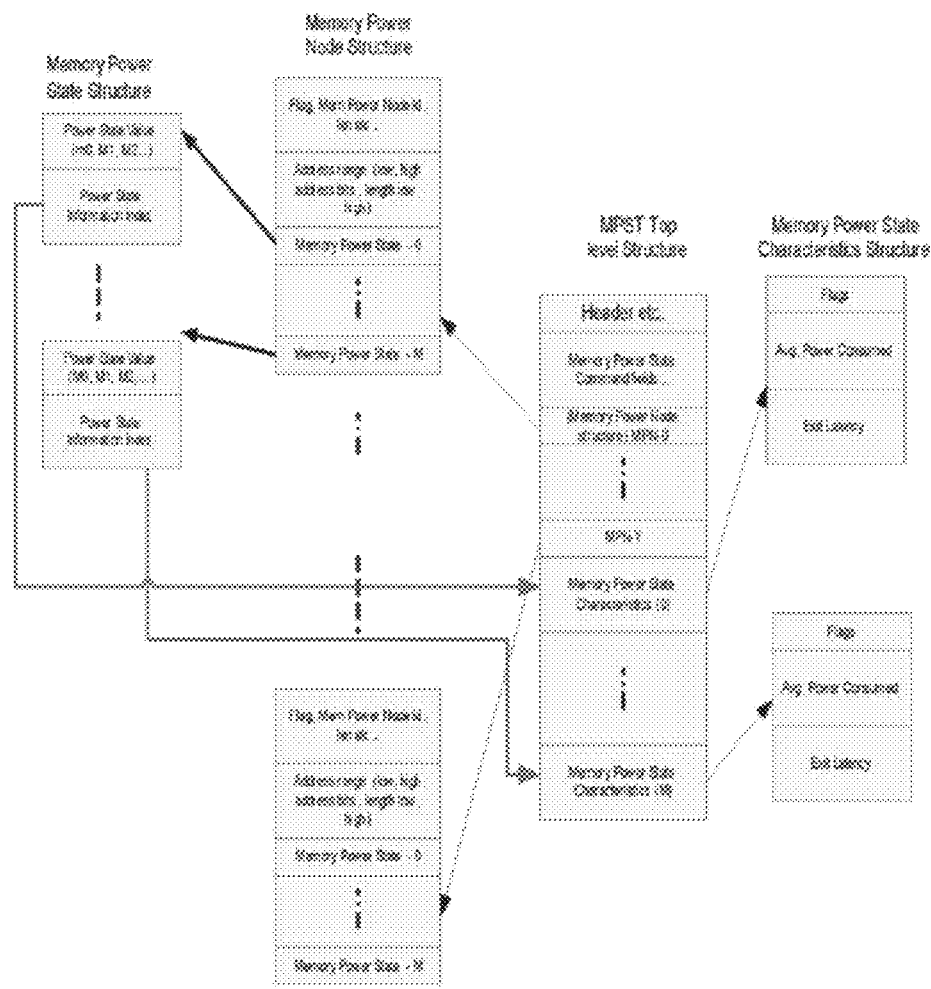
FIG. 6 is an organizational overview of an MPST table structure for an ACPI implementation in accordance with some embodiments.

With reference to FIGS. 6 and 8, a memory power state table (MPST) structure is shown. FIG. 6 illustrates table structures "folding out" from a top level MPST table (FIG. 8). This structure (which as indicated in the figure may include multiple sub structure (e.g., tables) defines the memory power node topology of the configuration. The configuration includes specifying memory power nodes and memory power state characteristics. Each memory power node is specified using address ranges and supported memory power states. The memory power states will typically include both hardware controlled and software controlled memory power states. There can be multiple entries for a given memory power node to support non contiguous address ranges. The MPST table also defines the communication mechanism between the OSPM and firmware for triggering software controlled memory power state transitions implemented in firmware. (For additional information, reference is made to ACPI 5.0 and in particular, to Section 5 of the ACPI 5.0 Specification.)

The MPST PCC Sub Channel Identifier value provided by the platform in this field should be programmed to the Type field of PCC Communications Subspace Structure. The MPST table references its PCC Subspace in a given platform by this identifier.

FIG. 9 is a table showing PCC Command Codes used by an MPST Platform Communication Channel. FIG. 10 is a table showing a Platform Communication Channel Shared Memory Region The OSPM may write PCC registers by filling in the register values in PCC sub channel space and issuing a PCC Execute command. (See FIG. 9). The other command values are reserved.

Figure 7:
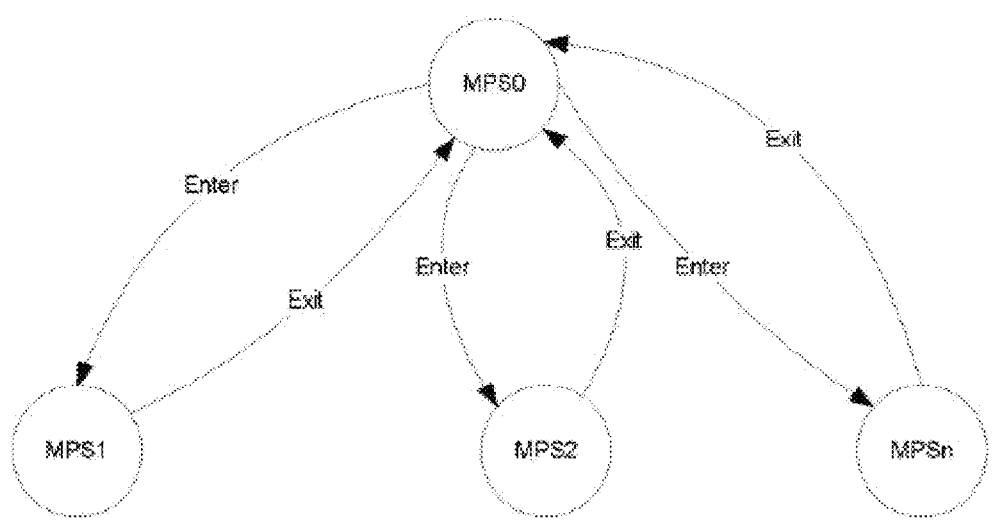
FIG. 7 is a diagram showing memory power state transitions for an ACPI implementation in accordance with some embodiments.

With reference to FIGS. 7, 11, and 12, memory power state characteristics will now be discussed. FIG. 7 is a diagram showing memory power state transitions. FIG. 11 is a table enumerating the power state values that a node can transition to and/or from for the different memory power states (MP0 to MPn), and FIG. 12 is a table showing command status information for the same. A memory power state represents the state of a memory power node (which maps to a memory address range) while the platform is in the G0 work mg state. A memory power node could be in an active state named MPS0 or in one of the power manage states, MPS1-MPSn. It should be noted that the active memory power state (MPS0) does not preclude memory power management in that state. It merely indicates that any active state memory power management in MPS0 is transparent to the OS PM and more importantly does not require assist from OSPM in terms of restricting memory occupancy and activity.

MPS1-MPSn states are characterized by non-zero exit latency for ex it from the state to MPS0. These states could require explicit OSPM-initiated entry and exit, explicit OSPM-initiated entry but autonomous exit or autonomous entry and exit. In all three cases, these states require explicit OSPM action to isolate and free the memory address range for the corresponding memory power node. Transitions to more aggressive memory power states (for example, from MPS1 to MPS2) can be entered on progressive idling but require transition through MPS0 (i.e. MPS1 to MPS0 to MPS2). FIG. 7 is a diagram showing memory power state transitions.

It is possible that after OSPM requests a memory power state, a brief period of activity returns the memory power node to MPS0 state. If the platform is capable of returning to a memory power state on a subsequent period of idle, the platform should treat the previously requested memory power state as a persistent hint.

A memory power node is a representation of a logical memory region that can be transitioned in and out of a memory power state as a unit. This logical memory region is made up of one or more system memory address range(s). A Memory Power Node is uniquely identified by Memory Power Node ID.

Note that memory power node structure defined in FIG. 13 can normally only represent a single address range. If a Memory Power Node contains more than one memory address range (i.e. non-contiguous range), firmware should construct a Memory power Node structure for each of the memory address ranges but specify the same Memory Power Node ID for all the structures.

Memory Power Nodes are not hierarchical. However, a given memory address range covered by a Memory power node could be covered by another memory power node if that node's memory address range is inclusive of the other node's range. For example, memory power node MPN0 may cover memory address range 1 G-2 G and memory power node MPN1 covers 1-4 G. Here, the MPN1 memory address range also comprehends the range covered by MPN0.

An OSPM is expected to identify the memory power node(s) that corresponds to the maximum memory address range that OSPM is able to power manage at a given time.

For example, if MPN0 covers 1 G-2 G and MPN1 covers 1-4 G and OSPM is able to power manage 1-4 G, it should select MPN1. If MPN0 is in a non-active memory power state, OSPM must move MPN0 to MPS0 (Active state) before placing MPN1 in desired Memory Power State.

Note: [Implementation Note in general, memory nodes corresponding to larger address space ranges correspond to higher memory aggregation (e.g. memory covered by a DIMM vs. memory covered by a memory channel) and hence typically presents higher power saving opportunities.

With reference to FIGS. 13 and 14, fields used for communicating memory power node information are shown. (FIG. 13 is a table showing memory power node structure definitions, and FIG. 14 is a table showing a flag format for the same.) Each entry in the MPST table should have corresponding memory power node structure defined.

FIG. 15 is a table showing memory power state structure definitions for an MPST structure in accordance with some embodiments. This structure communicates address range, number of power states implemented, information about individual power states, and the number of distinct physical components that comprise this memory power node The physical component identifiers can be cross-referenced against the memory topology table entries.

FIG. 16 is a table showing a memory power state characteristics structure for an MPST structure in accordance with some embodiments. It describes the power consumed, exit latency and the characteristics of the memory power state. FIG. 17 is table showing a flag format for the memory power state characteristics structure of FIG. 16.

(With reference to the table of FIG. 16, the following should be noted. "Average Power Consumed in MPS0 state" indicates the power in milli-Watts for the MPS0 state. "Relative power savings to MPS0" indicates the savings in the MPSx state as a percentage of savings relative to MPS0 state. Exit Latency provided in the Memory Power Characteristics structure for a specific power state is inclusive of the entry latency for that state. Exit latency should be provided for a memory power state regardless of whether the memory power state entry and/or exit are autonomous or requires explicit trigger from OSPM.)

Not all memory power management states require OSPM to actively transition a memory power node in and out of the memory power state. Platforms may implement memory power states that are fully handled in hardware in terms of entry and exit transition. In such fully autonomous states, the decision to enter the state may be made by hardware based on the utilization of the corresponding memory region and the decision to exit the memory power state may be initiated in response to a memory access targeted to the corresponding memory region.

The role of OSPM software in handling such autonomous memory power states is to vacate the use of such memory regions when possible in order to allow hardware to effectively save power. No other OSPM initiated action is required for supporting these autonomously power managed regions. However, it is not an error if the OSPM explicitly initiates a state transition to an autonomous entry memory power state through the MPST command interface. The platform may accept the command and enter the state immediately in which case it must return command completion with SUCCESS (OOOOOb) status. If the particular platform does not support explicit entry, it should return command completion with NOT SUPPORTED (0001Ob) status.

Platform firmware may have regions of memory reserved for its own use that are unavailable to the OSPM for allocation. Memory nodes where all or portion of the memory is reserved by firmware may pose a problem for OSPM because it does not know whether the firmware reserved memory is in use or not If the firmware reserved memory impacts the ability of the memory power node to enter memory power state(s), the platform should indicate to OSPM (by clearing the Power Managed Flag (see FIG. 14 for details) that this memory power node cannot be power managed. This allows OSPM to ignore such ranges from its memory power optimization.

The memory power state table structure describes address ranges for each of the memory power nodes specified. An OSPM can use the address ranges information provided in MPST table and derive processor affinity of a given memory power node based on the SRAT entries created by the firmware. The association of memory power node to proximity domain can be used by OSPM to implement memory coalescing, taking into account NUMA node topology for memory allocation/release and manipulation of different page lists in memory management code (implementation specific). An example of a policy which can be implemented in OSPM for memory coalescing is: OSPM can prefer allocating memory from local memory power nodes before going to remote memory power nodes.

The hot pluggable memory regions are described using memory device objects in ACPI namespace. The memory address range of these memory device objects may be defined using an ACPI_CRS method. The memory power state table (MPST) structure is a static structure created for all memory objects independent of hot plug status (online or offline) during initialization. The OSPM will populate the MPST table during the boot. If hot-pluggable flag is set for a given memory power node in the MPST table, the OSPM will not use this node until physical presence of memory is communicated through ACPI notification mechanism.

The association between memory device object (e.g. MEMO) to the appropriate memory power node ID in the MPST table is determined by comparing the address range specified using _CRS method and address ranges configured in the MPST table entries. This association should be identified by OSPM as part of ACPI memory hot plug implementation. When memory device is "hot added", as part of existing ACPI driver for memory hot plug, OSPM will scan device object for _CRS method and get the relevant address ranges for the given memory object, OSPM will determine the appropriate memory power node IDs based on the address ranges from _CRS and enable it for power management and memory coalescing Similarly, when memory is "hot removed", the corresponding memory power nodes will be disabled.

OSes (non-virtualized OS or a hypervisor/VMM) may need to allocate non-migratable memory. It is recommended that the OSes (if possible) allocate this memory from memory ranges corresponding to memory power nodes that indicate they are not power manageable. This allows OS to optimize the power manageable memory power nodes for optimal power savings. OSes can assume that memory ranges that belong to memory power nodes that are power manageable (as indicated by the flag) are interleaved in a manner that does not impact the ability of that range to enter power managed states. For example, such memory is not cache-line interleaved.

FIG. 18 shows a platform memory topology table (PMTT). This table describes the memory topology of the system to OSPM, where the memory topology can be logical or physical. The topology may be provided to the last level physical component (e.g. DIMM).

Figure 21:
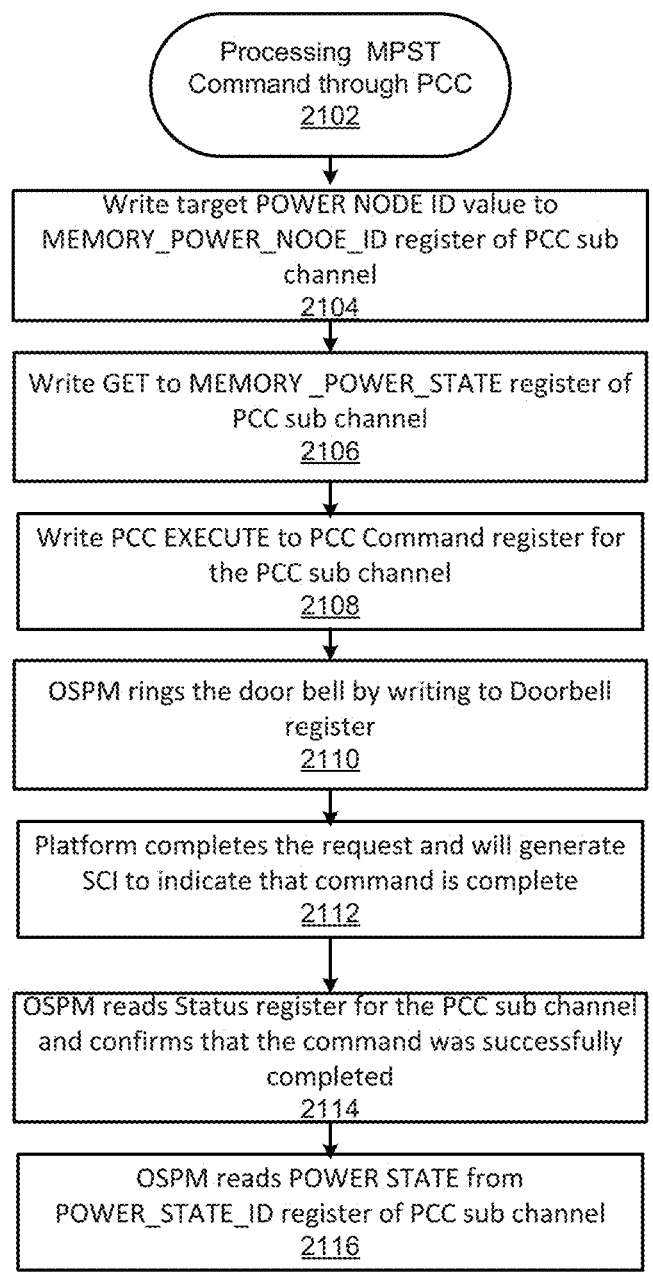
FIG. 21 is a flow diagram of a routine for processing a MPST command through a Platform Communications Channel (PCC) in accordance with some embodiments.

FIG. 21 is a diagram showing a processing flow 2102 for processing an MPST command through an ACPI PCC. At 2104, the OSPM should write a target POWER NODE ID value to MEMORY_POWER_NOOE_ID register of the appropriate PCC sub channel to specify a memory power node to be power managed. At 2106, it should write a desired POWER STATE ID value to the POWER STATE ID register of the PCC sub channel to assign the desired power state for the previously identified memory power node.

At 2108, the OSPM writes SET (See FIG. 10) to the MEMORY_POWER_COMMAND register of the PCC sub channel. At 2110, it writes the EXECUTE command (See FIG. 9) to PCC Command register for the PCC sub channel. At 2112, the OSPM "rings the door bell" by writing to the Doorbell register.

At 2114, the platform completes the request and should generate an SCI (system control interrupt) to indicate that the command is complete. At 2116, the OSPM should then read the Status register for the PCC sub channel and confirm that the command was successfully completed.

Now, a process flow for an OSPM to get memory power state information, for a desired memory power node, will be described. The OSPM writes target POWER NODE ID value to MEMORY POWER_NOOE_ID register of PCC sub channel. Next, it writes GET (See FIG. 10) to MEMORY_POWER_COMMAND register of PCC sub channel. Next, it writes PCC EXECUTE (Sec FIG. 9) to PCC Command register for the PCC sub channel. Next, the OSPM rings the door bell by writing to the Doorbell register. The platform should then complete the request and generate an SCI to indicate that the command is complete. The OSPM should then read the Status register for the PCC sub channel and confirm that the command was successfully completed. Finally, the OSPM can read the POWER STATE from POWER_STATE_ID register of PCC sub channel.

The invention is not limited to the embodiments described, but can be practiced with modification and alteration within the spirit and scope of the appended claims. It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme.

What is claimed is:

1. An apparatus for memory power management to save power, the apparatus comprising:
   one or more memories; and
   a firmware including Advanced Configuration and Power Interface (ACPI) components to build, at the time of boot, a memory power state table (MPST) structure, wherein the MPST structure is associated with the one or more memories, wherein the MPST structure includes a table having information about platform control channel (PCC) information,
   wherein the MPST table structure is stored in a dedicated firmware memory space,
   wherein firmware is to use the information in the MPST table to allow the apparatus to save power,
   wherein data in the MPST structure is updated by a platform, and
   wherein the firmware to update some parts of the MPST structure while the platform is operating.

2. The apparatus of claim 1, wherein the MPST structure includes a table with power state values.

3. The apparatus of claim 1, wherein the MPST structure includes a table with memory power node structure definitions for the one or more memories.

4. The apparatus of claim 1, wherein the MPST structure includes a table with memory power state structure definitions.

5. The apparatus of claim 1, wherein the MPST structure includes a common memory aggregator device structure.

6. The apparatus of claim 1, wherein the one or more memories and the firmware are part of a computer platform that is one of a:
   smart-phone,
   tablet, or
   server computer.

7. The apparatus of claim 1, wherein the memory power nodes represent logical memory regions, associated with the one or more memories, that can be transitioned in and out of memory power states.

8. The apparatus of claim 1, wherein each of the memory power nodes is uniquely identified.

9. The apparatus of claim 1, wherein the memory power state characteristics describe memory power state transitions.

10. The apparatus of claim 1, wherein the firmware to create the MPST structure in a dedicated firmware memory space.

11. A method for memory power management to save power, the method comprising:
    building, at the time of boot, a memory power state table (MPST) structure compatible with an Advanced Configuration and Power Interface (ACPI), wherein the MPST structure is associated with one or more memories, wherein the MPST structure includes a table having information about platform control channel (PCC) information,
    wherein the MPST table structure is stored in a dedicated firmware memory space,
    wherein the information in the MPST table is used to allow an apparatus to save power,
    wherein data in the MPST structure is updated by a platform, and
    wherein the firmware is to update some parts of the MPST structure while the platform is operating.

12. The method of claim 11, wherein the MPST structure includes a table with power state values.

13. The method of claim 11, wherein the MPST structure includes a table with memory power node structure definitions for the one or more memories.

14. The method of claim 11, wherein the MPST structure includes a table with memory power state structure definitions.

15. The method of claim 11, wherein the MPST structure includes a common memory aggregator device structure.

16. The method of claim 11, wherein the memory power nodes represent logical memory regions, associated with the one or more memories, that can be transitioned in and out of memory power states.

17. The method of claim 11, wherein each of the memory power nodes is uniquely identified.

18. The method of claim 11, wherein the memory power state characteristics describe memory power state transitions.

19. A non-transitory computer executable storage media having instructions stored thereon that when executed cause a one or more processors to perform one or more operation for memory power management to save power, the method comprising:
- building, at the time of boot, a memory power state table (MPST) structure compatible with an Advanced Configuration and Power Interface (ACPI), wherein the MPST structure is associated with one or more memories, wherein the MPST structure includes a table having information about platform control channel (PCC) information,
- wherein the MPST table structure is stored in a dedicated firmware memory space,
- wherein the information in the MPST table is used to allow an apparatus to save power,
- wherein data in the MPST structure is updated by a platform, and
- wherein the firmware is to update some parts of the MPST structure while the platform is operating.

* * * * *